R. P. JACKSON.
SYSTEM OF CONTROL FOR ALTERNATING DIRECT CURRENT MOTORS.
APPLICATION FILED DEC. 18, 1905.

967,387.

Patented Aug. 16, 1910.

WITNESSES:
C. L. Belcher
Otto S. Schairer

INVENTOR
Ray P. Jackson
BY
Wesley Jackson
ATTORNEY

R. P. JACKSON.
SYSTEM OF CONTROL FOR ALTERNATING DIRECT CURRENT MOTORS.
APPLICATION FILED DEC. 18, 1905.

967,387.

Patented Aug. 16, 1910.

WITNESSES:
Camille Boulin
Otto S. Schairer.

INVENTOR
Ray P. Jackson
BY
Wesley G. Carr
ATTORNEY

R. P. JACKSON.
SYSTEM OF CONTROL FOR ALTERNATING DIRECT CURRENT MOTORS.
APPLICATION FILED DEC. 18, 1905.

967,387.

Patented Aug. 16, 1910.

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ALTERNATING-DIRECT-CURRENT MOTORS.

967,387. Specification of Letters Patent. Patented Aug. 16, 1910.

Application filed December 18, 1905. Serial No. 292,236.

*To all whom it may concern:*

Be it known that I, RAY P. JACKSON, a citizen of the United States, and a resident of Wilkinsburg, in the county of Allegheny and State of Pennsylvania, have invented a new and useful Improvement in Systems of Control for Alternating-Direct-Current Motors, of which the following is a specification.

My invention relates to systems of control for electric motors and particularly to systems of control for motors or other translating devices that are adapted to be operated by either alternating or direct current.

The object of my invention is to provide a system of control for motors or devices of the above character that shall embody means whereby the circuit relations of the motors may be adjusted automatically in accordance with the character of energy that may be supplied from the distributing circuit.

A further object is to provide means whereby the auxiliary circuits and controlling devices may be supplied automatically with the same character of energy as is supplied to the motor or main circuits.

Since the development of a commutator type of alternating current motor which may also be operated satisfactorily by direct current it has been found desirable to equip electrical railway vehicles therewith and particularly such vehicles as are employed in interurban service in order that the vehicles may be operated in cities and towns upon the existing direct current systems and by alternating currents in the rural districts where it is generally desirable to secure greater efficiency in the longer distances of transmission by the use of high voltages.

While alternating current may be efficiently transformed from one voltage to another by means of very simple and comparatively inexpensive apparatus and may consequently be transmitted to a railway system at a high voltage and be utilized by the motors at a low voltage, transformation of direct currents from one voltage to another can be effected only by means of complicated and expensive apparatus and only when the difference in voltage is small. Such being the case, direct currents are usually applied to the motors at the transmission voltage.

It has generally been found most expedient to arrange motors in different circuit relations when operating by alternating currents than when operating by direct currents; for instance, when a vehicle is provided with four motors they are often connected in series parallel relation for operation by alternating currents and in series relation for operation by direct currents. It is also desirable in many cases, when operating by direct current, to provide a ratio of field ampere turns to armature ampere turns for starting that differs from the ratio provided for running conditions, or a ratio for operating by direct current that differs from the ratio for operating by alternating current.

It is one of the objects of my invention to provide means whereby the circuit relations of the motors may be changed automatically in accordance with the desired conditions, as the character of the energy supplied thereto is changed. My invention also provides means whereby the control or governing circuits of a system may be supplied automatically with the same character of energy as that derived from the distributing circuit. Other features of novelty will be more specifically pointed out in the following portions of the specification and in the claims.

Figure 1:
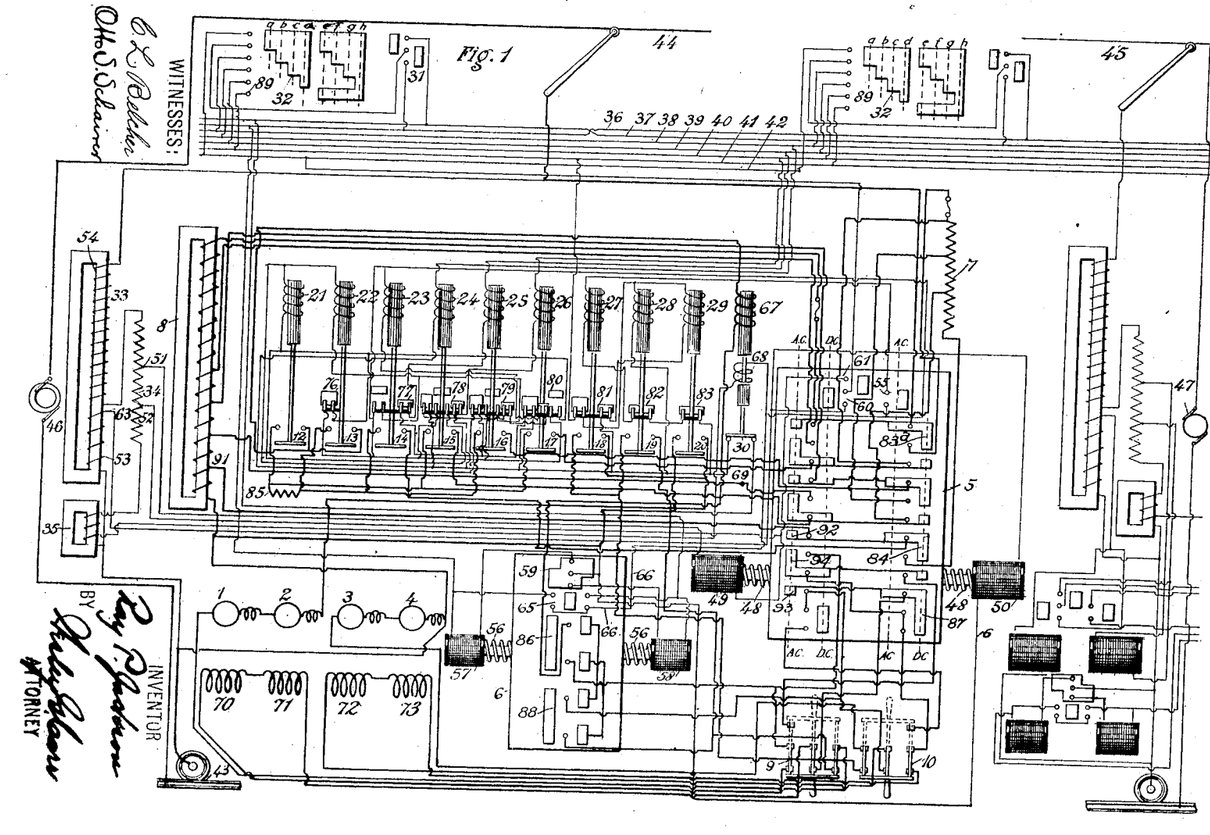
Figure 1, of the accompanying drawings, illustrates diagrammatically a complete system of control embodying my invention.

The system comprises among its elements, motors 1, 2, 3 and 4; a change-over switch 5 for arranging the circuit relations of the motors for operation by direct and alternating current respectively; a reversing switch 6 whereby the circuits of the motors are adjustable, respectively, for forward and reverse rotation; a resistance 7 which is included in circuit with the motors when operating by direct current; a transformer 8 from which the motors are supplied when operating by alternating current; cutout switches 9 and 10 whereby either pair of motors may be removed from the circuits on account of injury thereto or for other reasons; a set of main switches 12, 13, 14, 15, 16, 17, 18, 19 and 20 whereby the motor circuits are governed and the operations of which are controlled by means of magnet windings 21, 22, 23, 24, 25, 26, 27, 28 and 29; an overload relay switch 30 whereby closure of the switches 12 to 20 inclusive is prevented when the current supplied to the motors exceeds a predetermined amount; a master switch 31 for controlling operation of the reversing switch 6; a master switch 32 for controlling operation of the switches 12 to 20 inclusive; an auxiliary transformer 33, an auxiliary resistance 34 and a choke coil 35 from which the auxiliary and main circuits of the systems are supplied; train conductors 36, 37, 38, 39, 40, 41 and 42 that may be extended from one car to another in a train whereby the control systems on the several cars may be governed in parallel from a single master switch at the head of the train or at any other desirable location; a track rail or grounded conductor 43, trolley conductors 44 and 45 from which the system is adapted to be supplied with either alternating or direct current by an alternating current generator 46 and a direct current generator 47, respectively, or from any other suitable sources.

Figure 2:
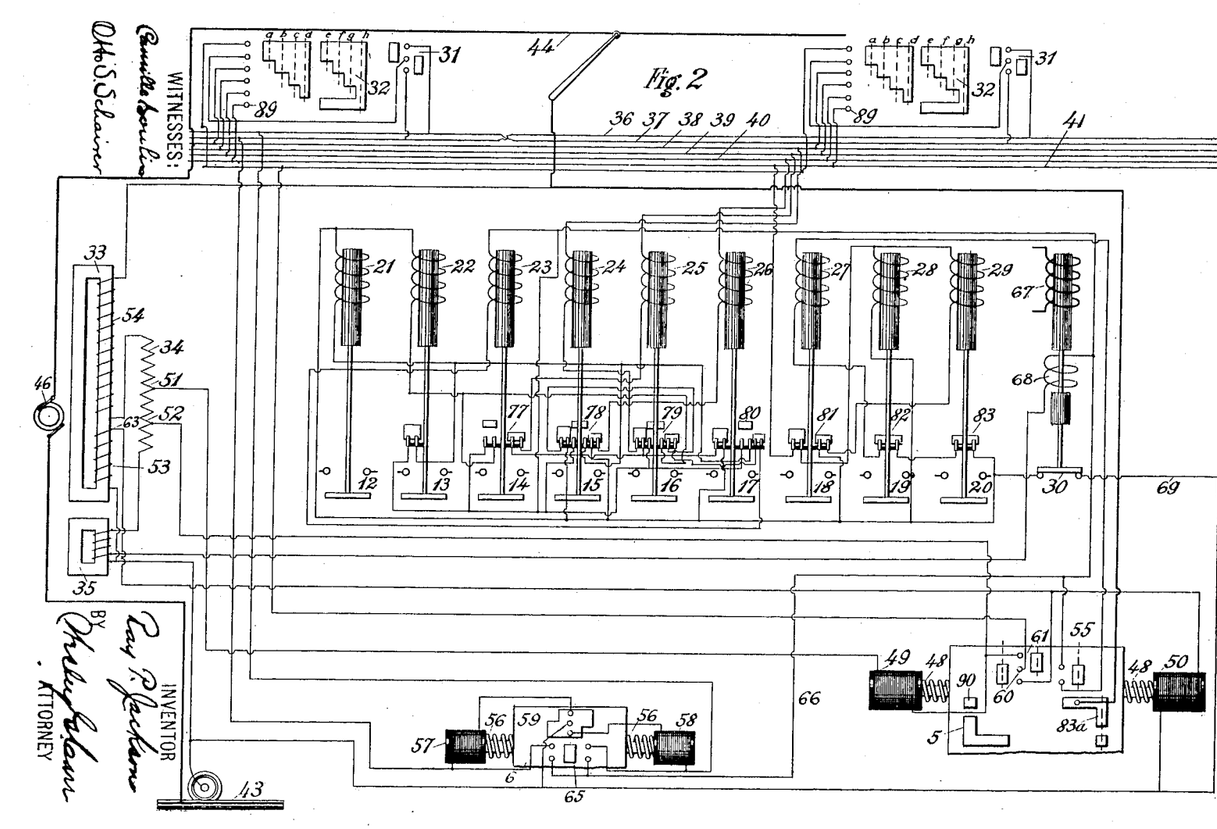
Fig. 2 is an enlarged diagrammatic view of the auxiliary or governing circuits of the system shown in Fig. 1.
Figure 3:
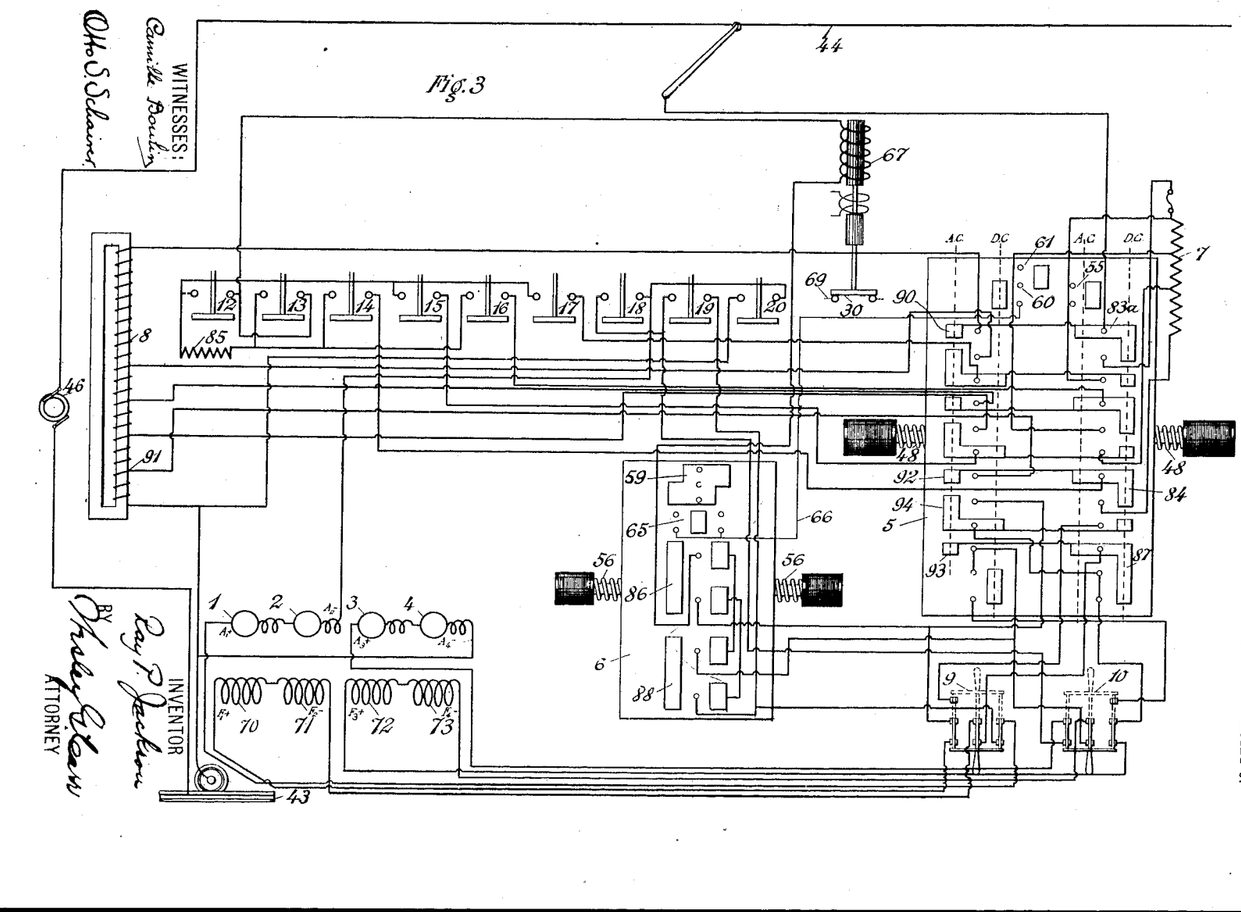
Fig. 3 is an enlarged diagrammatic view of the main or motor circuits of the system shown in Fig. 1.

The change-over switch 5 is maintained normally in a central position, or so that the motor circuits are not arranged for either direct or alternating current operation, by means of centralizing springs 48. Operation of the change-over switch to the left, or so as to bring the conducting segments that are on the dot and dash lines D—C into engagement with corresponding contact fingers for the purpose of arranging the motor circuits for operation by direct current, is governed by means of a magnet winding 49, and operation to the right, or so as to bring the conducting segments on the dot and dash lines A—C into engagement with the corresponding contact fingers for the purpose of arranging the motor circuits for operation by alternating current, is governed by means of a magnet winding 50. The respective terminals of the magnet winding 49 are connected to suitable points 51 and 52 in the auxiliary resistance 34 whereby it is arranged directly in shunt to the intervening portion of said resistance. The magnet winding is so constructed that only a small amount of current, as compared with that traversing the resistance 34, is required to energize it, and consequently the voltage applied to the winding 49 will be only slightly less than that which would exist between the points 51 and 52 if the winding were not connected thereto. The mode of operation of this portion of the system will be readily understood by those skilled in the art. The magnet winding 50 is connected in shunt to secondary winding 53 of the transformer 33 one terminal of which is connected to the track rail 43, and the voltage impressed upon it, therefore, when alternating current is supplied to the system and to primary winding 54 of the transformer 33, is equal to that existing between the terminals of the secondary winding 53. The ohmic resistances of the primary winding 54 of the transformer and of the choke coil 35 will, in practice, be low, as compared with that of the device 34, so that when direct current is supplied to the system, nearly all of the drop of potential in this portion of the circuit will occur in the resistance 34, and an operating voltage will be impressed upon the magnet winding 49. Because of the high inductive resistance of the primary winding 54 and of the choke coil 35, however, when alternating current is supplied to the system, nearly all of the drop of potential will occur therein and but comparativey little in the resistance 34. An operating voltage will not then be applied to the winding 49 and the change-over switch cannot be moved so as to arrange the circuits of the motor for operation by direct current when alternating current is supplied to the system. The secondary winding 53 of the transformer is energized inductively from the primary winding when alternating current is supplied to the system and the voltage of the secondary winding is impressed upon the magnet winding 50 whereby the change-over switch is moved to the position for arranging the circuits of the motors for alternating current operation.

An interlocking switch 55 that is operated by the change-over switch prevents energizing of the magnet winding 27 of the switch 18 when the change-over switch occupies a position for arranging the motor circuits for alternating current operation thereof, for a purpose which will be hereinafter more fully set forth.

The reversing switch 6 is maintained in its central or "off" position by means of springs 56 and its operation to the left and right is effected, respectively, by magnet windings 57 and 58, one terminal of each of which is adapted to be connected to the grounded conductor 43 by means of an interlocking switch 59 that is operated by the reversing switch, which serves also to prevent simultaneous energizing of both of the magnet windings. The remaining terminals of the magnet windings 57 and 58 are adapted to be connected, by means of the master switches 31 and 32, to contact terminal 60 of an interlocking switch 61 that is operated by the change-over switch 5. The interlocking switch 61 serves to connect the terminals of the magnet windings 57 and 58, either to the point 52 in the auxiliary resistance 34 or to terminal 63 of the secondary winding 53 of the transformer 33, according as the change-over switch occupies a position for connecting the motors for operation by direct or by alternating current. The reversing switch is thereby prevented from operation to either its forward or its reverse position until the change-over switch has arranged the motor circuits corresponding to the character of energy that may be supplied to the system.

It will be observed that, when the change-over switch occupies a position for arranging the motor circuits for direct current operation, the magnet windings 57 and 58 are connected in shunt to a portion of the resistance 34 and the choke coil 35 and the voltage that may be impressed upon them is approximately equal to the difference of potential existing between the point 52 and the ground at 43. When the change-over switch occupies a position for arranging the motor circuits for alternating current operation the magnet windings 57 and 58 are connected in shunt to the secondary winding 53 of the transformer 33, and consequently the voltage impressed upon them is equal to that of the winding 53.

An interlocking switch 65 that is operated by the reversing switch prevents energizing of the magnet windings 21 to 29 inclusive of the switches 12 to 20 inclusive until the reversing switch has been moved to either its forward or its reverse position, all of the magnet windings 21 to 29 inclusive being supplied with energy through a conductor 66 the circuit of which is adapted to be interrupted by the interlocking switch 65. Energizing of the magnet winding 27 is further prevented by the interlocking switch 55 in a manner which has previously been described.

Operation of the overload relay switch 30 is controlled by means of a magnet winding 67 that is arranged in series circuit with the motors and that is supplied with a sufficient amount of energy to cause opening of the switch only when the current which traverses the motor circuit exceeds a predetermined amount. When once opened it is maintained in that position, until the reversing switch 6 is returned to its "off" position, by means of a retaining magnet winding 68 that is connected in shunt circuit to portions of the resistance 34 and of choke coil 35 when direct current is supplied to the system and in shunt circuit to portions of the choke coil 35 and the secondary winding 53 of the transformer 33 when alternating current is supplied to the system. The overload relay switch 30 serves to interrupt the circuit through conductor 69 by means of which the circuits through the switch magnet windings 21 to 29 inclusive are completed to the ground at 43, and thereby prevents energizing of the windings when the current traversing the motor circuits exceeds a predetermined amount.

It has been noted that the circuits of the magnet windings 21 to 29 inclusive are completed by the conductors 66 and 69 that are adapted to be connected by means of the several switches to the point 52 in the resistance 34 and to the ground at 43, respectively, when direct current is supplied to the system, and to the terminal 63 of the secondary winding 53 and the ground at 43, respectively, when alternating current is supplied to the system. They are thus supplied with energy in an exactly similar manner to that in which the reversing switch magnet windings 57 and 58 are supplied.

Figure 4:
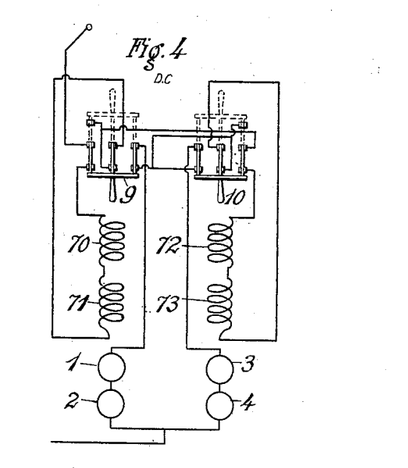
Fig. 4 is a simplified diagrammatic view which illustrates clearly the positions in the circuits and the functions of the cutout switches when operating by direct current.
Figure 5:
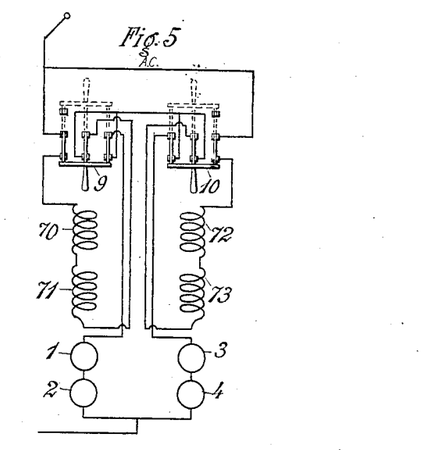
Fig. 5 illustrates similar conditions when operating by alternating current.
Figures 8, 9:
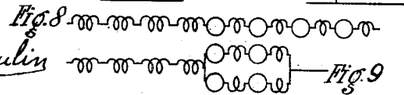
Fig. 8 shows the connections of the motors under starting and slow speed operating conditions on direct current.
Fig. 9 illustrates the circuit relations of the motors when operating by direct current under running conditions.

The functions and dispositions in the motor circuits of the cutout switches 9 and 10 may be best understood from a consideration of the simplified diagrams of the motor circuits shown in Figs. 4 and 5, the former of which illustrates the circuits under running conditions when operating by direct current and the latter when operating by alternating current (see Fig. 9). If the switch 10 occupies the position shown in broken lines in Fig. 4 the motors 3 and 4 will be excluded from the circuit that comprises the left hand blade of switch 9, field magnet windings 70 and 71 of the motors 1 and 2, the middle blade of switch 9, the right hand blade of switch 10 in its broken line position, right hand blade of switch 9 and the armatures of the motors 1 and 2. It will be observed that the circuits of the motors 3 and 4 are interrupted at one terminal of the series-connected field magnet windings 72 and 73 and between the field magnet windings 73 and the armature of the motor 3. The circuits of the motors 1 and 2 will be similarly interrupted and those of motors 3 and 4 similarly established if the switch 9 is moved to the position shown in broken lines and the switch 10 occupies its full line position.

When operating by alternating current, if the switch 10 is moved to the position shown by the broken lines, the circuits of the motors 3 and 4 will be interrupted as described when direct current is supplied thereto and a circuit will be established through the left hand blade of switch 9, field magnet windings 70 and 71 of the motors 1 and 2, the middle blade of the switch 9, the right hand blade of the switch 9 and the armatures of the motors 1 and 2. It will be understood that the circuits of the motors 1 and 2 will be interrupted and those of the motors 3 and 4 established in an exactly similar manner to what has been described when the blade 10 occupies its full line position and the switch 9 that shown in broken lines.

Figure 6:
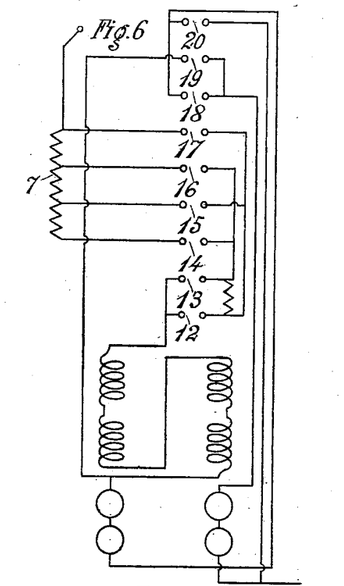
Fig. 6 is a simplified, diagrammatic view of the motor circuits when operating by direct current which illustrates clearly the positions of the main switches.

The switches 13 to 20 inclusive are provided with interlocking switches 76 to 83 inclusive for governing the circuits of the magnet windings 21 to 29 inclusive and causing the switches to be operated only in a predetermined order. The functions of such switches is well understood in the art and consequently it is deemed necessary to state only the predetermined order in which the switches are to operate and to point out wherein the operation is peculiar. If the change-over switch occupies a position for arranging the circuits of the motors for operation by direct current while the reversing switch occupies either its forward or reverse position and the master switch 32 occupies position $a$, the switches 12, 14 and 18 will close and a circuit will be established thereby from trolley conductor 44 through conducting segment 83$^a$, the resistance 7, conducting segment 84, switch 14, resistance 85, switch 12, magnet winding 67 of the overload relay switch 30, conducting segment 86 of the reversing switch 6, the left hand blade of cutout switch 9, field magnet windings 70 and 71 of the motors 1 and 2, the middle blade of the cutout switch 9, conducting segment 87 of the change-over switch, the right hand blade of switch 10, field magnet windings 72 and 73 of the motors 3 and 4, the middle blade of the switch 10, conducting segment 88 of the reversing switch, the right hand blade of the cutout switch 9, the armatures of the motors 1 and 2, switch 18, the left hand blade of cutout switch 10 and the armatures of motors 3 and 4. This circuit, as well as those which are subsequently established by the operation of the master switch 32 through its succeeding positions, will be best understood from a consideration of Figs. 6 and 8 from which it is seen that current is supplied to the motors through the resistances 7 and 85, the motors being connected in series. The switch 13 next closes and the switch 12 opens, thereby removing the resistance 85 from the circuit. When the master switch 32 is moved to the position $b$ switches 13, 15 and 18 are first closed and then switches 12, 15 and 18 are closed; when the master switch is moved to the position $c$ switches 12, 16 and 18 are first closed and finally switches 13, 16 and 18 are closed; when the master switch occupies the position $d$ the switches 13, 17 and 18 are first closed and then switches 12, 17 and 18 are closed. The resistance 7 is thereby removed from the circuit in steps, the motors remaining in series.

If the master switch is moved to the position $e$ switches 12, 14, 19 and 20 are closed, it being noted at this point that one terminal of each of the magnet windings 28 and 29 of the switches 19 and 20 is connected to contact terminal 89 of the master switch 32 and consequently the magnet windings 28 and 29 cannot be energized until the master switch occupies the position $e$. A circuit is then established from trolley conductor 44 through conducting segment 83$^a$, resistance 7, conducting segment 84, switch 14, resistance 85, switch 12, magnet winding 67 of the overload relay switch 30, conducting segment 86 of the reversing switch 6, the left hand blade of the cutout switch 9, field magnet windings 70 and 71 of the motors 1 and 2, the middle switch blade of the cutout switch 9, conducting segment 87 of the change-over switch, the right hand blade of the cutout switch 10, field magnet windings 72 and 73 of the motors 3 and 4, the middle blade of the cutout switch 10, and conducting segment 88 of the reversing switch 6, where the circuit divides, one portion traversing the right hand blade of cutout switch 9, the armatures of motors 1 and 2 and switch 20 to the track rail 43, and the other portion traversing the switch 19, the left hand blade of the cutout switch 10 and the armatures of motors 3 and 4 to the track rail 43. The motors then have their field magnet windings connected in series and their armatures connected in series parallel relation, as illustrated in Fig. 9, with the resistance 7 in circuit. The switch 13 next closes and the switch 12 opens, thereby removing the resistance 85 from the circuit. During the succeeding operations of the switches, which are caused by the movement of the master switch 32 through its succeeding positions $f$, $g$ and $h$, switches 12 to 17 inclusive are closed in the same sequence as that in which they were closed when the master switch was moved through positions $b$, $c$ and $d$.

Figure 7:
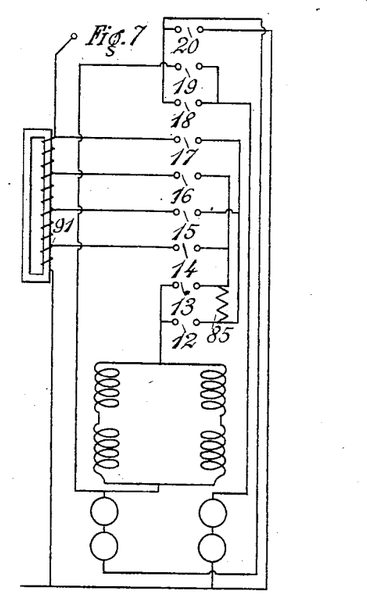
Fig. 7 illustrates similar conditions when operating by alternating current.
Figure 10:
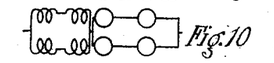
Fig. 10 illustrates diagrammatically the circuit relations of the motors when operating by alternating current and Figs. 11 and 12 illustrate modifications of the portion of the system shown in Fig. 2.

When the change-over switch occupies the position for arranging the motor circuits for operation by alternating current, a circuit is established through segments 83$^a$ and 90 of the change-over switch and transformer winding 8 to the track rail 43, and the circuit of the magnet winding 27 of the switch 18 is interrupted by means of the interlocking switch 55 as before noted, this switch consequently remaining open during operation by alternating current. It has been pointed out that magnet windings 28 and 29 of the switches 19 and 20 cannot be energized until the master switch 32 is moved to the position *e* and inasmuch as these switches are utilized in establishing the motor circuits, when operating by alternating current, the master switch 32 may be operated through positions *a* to *d* inclusive without establishing the motor circuits. However, when the master switch occupies the position *e*, a circuit is established from a point 91 in the transformer winding 8 through conducting segments 92 and 84 of the change-over switch, switch 14, resistance 85, switch 12, winding 67 of the overload relay switch 30 and conducting segment 86 of the reversing switch, where the circuit divides; one portion traversing the left hand blade of the cutout switch 9, field magnet windings 70 and 71, the middle blade of the cutout switch 9, and conducting segments 87 and 93 of the change-over switch to conducting segment 88 of the reversing switch, where the circuits again unite. The other portion of the circuit traverses conducting segment 94 of the change-over switch, the right hand blade of the cutout switch 10, field magnet windings 72 and 73, and the middle blade of the cutout switch 10 to the conducting segment 88 of the reversing switch. The circuit again divides, after traversing the conducting segment 88, one portion traversing the right hand blade of the cutout switch 9, the armatures of the motors 1 and 2 and switch 20, and the other portion traversing switch 19, the left hand blade of the cutout switch 10, and the armatures of the motors 3 and 4. The conditions of the circuits thus established may be best understood from a consideration of Figs. 7 and 10, in the former of which the positions of the switches in the motor circuits are illustrated and in the latter of which the motor circuits, as thus established, are shown. The switch 13 next closes and the switch 12 opens, thereby removing the resistance 85 from the circuit.

The resistance 85 is provided for the purpose of reducing the amount of current that may traverse a local short circuit which is formed upon closure of successive switches of the series marked 14 to 17 inclusive. It also serves the usual function of reducing the amount of current which may be supplied to the motors during the predetermined period that it is included in circuit.

As the master switch 32 is moved through the successive positions *f*, *g* and *h*, the switches 12 to 17 inclusive will close in the same order as was described for operation by direct current, the resistance 85 being included first in the local circuit whenever successive switches are closed simultaneously, then included directly in the motor circuit, and finally removed.

Figure 11:
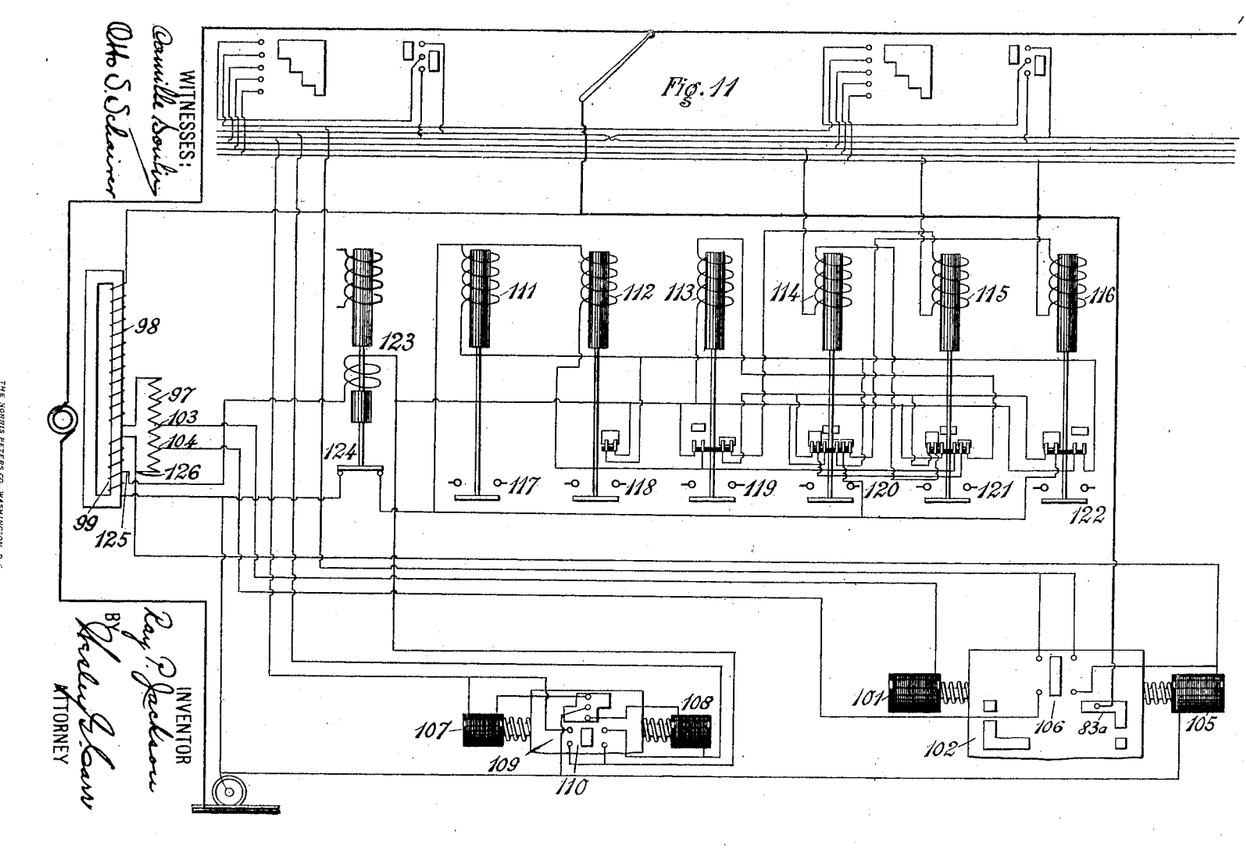

The diagram of Fig. 11 differs somewhat from that of Fig. 2, the difference being chiefly that an auxiliary resistance 97 is arranged in series circuit between inductive windings 98 and 99, the choke coil 35 of the diagram of Fig. 2 being omitted. Magnet winding 101, which causes operation of change-over switch 102 to a position for arranging the circuits of the motors for operation by direct current, is connected in shunt to a portion of the auxiliary resistances 97 between the points 103 and 104 and magnet winding 105, which causes operation of the change-over switch to arrange the circuits of the motors for operation by alternating current, is connected in shunt to the inductive winding 99. Because of the low ohmic resistance of the inductive windings 98 and 99, comparatively little drop in potential occurs therein when direct current is supplied to the system, by far the greater portion of the drop of potential between the supply conductors occurring in the resistance 97. If the current supplied to the magnet winding 101 is small as compared with that traversing the resistance 97, the voltage applied thereto will then be approximately that existing between the point 103 and 104 in the auxiliary resistance 97. However, when alternating current is supplied to the system, substantially all of the drop of potential between the supply conductors will occur in the windings 98 and 99 and insufficient difference of potential will exist between the points 103 and 104 of the resistance 97 to cause an operating voltage to be impressed upon the magnet winding 101. The magnet winding 105 being connected in shunt to the inductive winding 99, has impressed upon it a voltage equal to the drop in potential over that winding.

The change-over switch 102 is provided with an interlocking switch 106 which corresponds in all respects to the interlocking switch 61 of Fig. 2 and prevents energizing of magnet windings 107 and 108 of reversing switch 109 until the change-over switch has been operated to arrange the motor circuits for operation either by alternating or by direct current. An interlocking switch 110, corresponding to interlocking switch 65 of Fig. 2, is operated by the reversing switch 109 and prevents energizing of magnet windings 111, 112, 113, 114, 115 and 116 of switches 117, 118, 119, 120, 121 and 122, respectively, which govern the amount of resistance, or the active length of the main transformer winding that is included in the motor circuits, until after the reversing switch has been moved to either its forward or its reverse position. It will be observed that the number of switches for controlling the motor circuits is smaller than in Fig. 2 but I deem it unnecessary to describe their operation in detail since the switches 117 to 122 correspond, respectively, to switches 12 to 17, inclusive, of Fig. 2 and operate in the same manner and sequence.

One terminal of retaining magnet winding 123 of overload relay switch 124 is connected to a suitable point 125 in the transformer winding 99 and the other terminal is adapted to be connected, by means of interlocking switches 110 and 106, to a point 104 in the auxiliary resistance 97 when direct current is supplied to the system and to junction 126 of the auxiliary resistance 97 with the inductive winding 99. It is evident, then, that, when direct current is supplied to the system, the magnet winding 123 is connected in shunt circuit between the point 104 in the resistance 97 and the point 125 in the inductive winding 99, and that when alternating current is supplied to the system a voltage is impressed upon the winding equal to that existing between the points 125 and 126 in the inductive winding 99. It will be understood that, as in Fig. 2, the magnet winding 123 serves to retain the overload relay switch in an open position and to thereby interrupt the circuits of the magnet windings 111 to 116 inclusive until the reversing switch has been returned to its "off" position.

Figure 12:
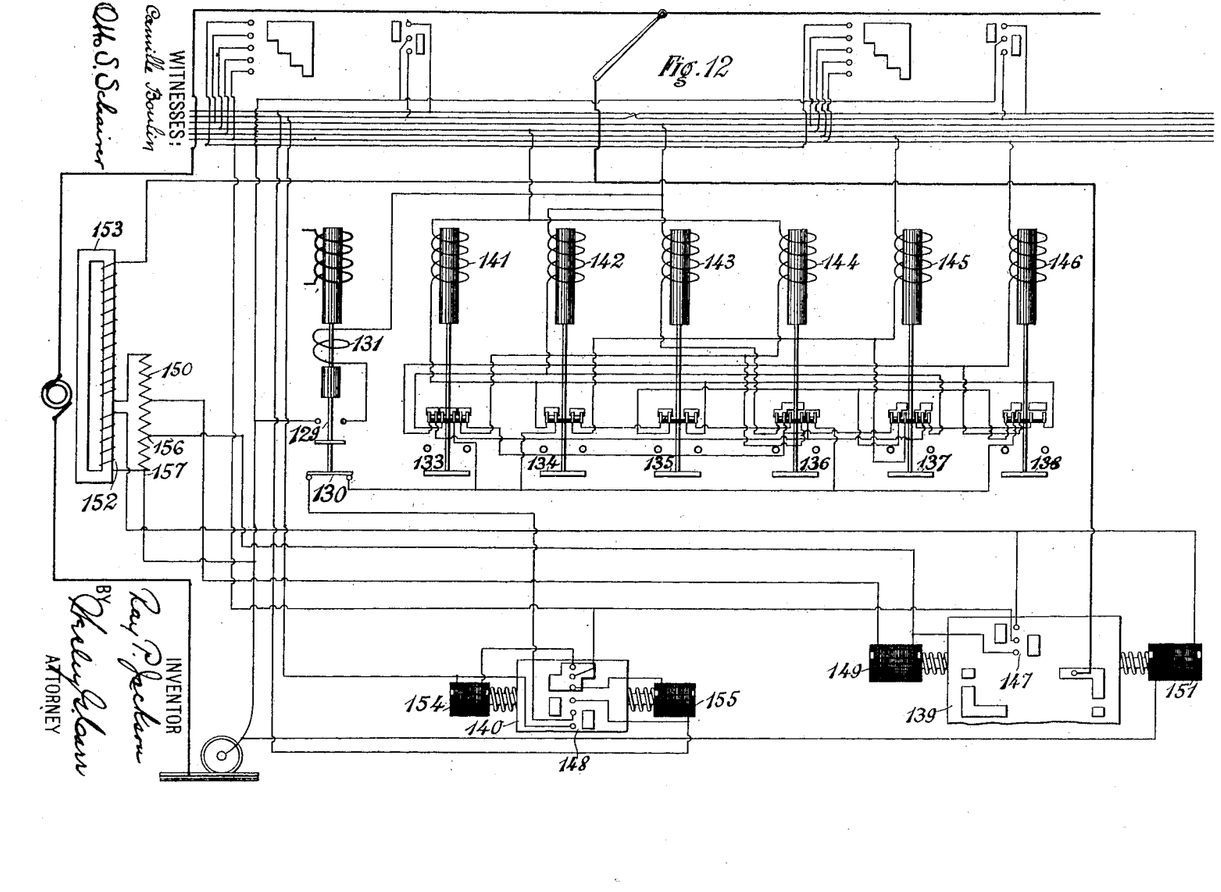

As has been observed in connection with Figs. 2 and 11, the retaining magnet windrings for the overload relay switch are supplied continuously with energy so long as the system is in operation but substantially no effect is produced upon the switch until it has been opened, when the winding retains the switch in its open position. Because of the difficulty of providing a magnet winding that is adapted to be supplied with alternating current and that does not become excessively heated when supplied with direct current, and also to prevent a continual loss of energy in the retaining magnet winding, it may be deemed advisable in many cases to close the circuit of the retaining magnet winding only after the relay switch has been opened. In Fig. 12 I have shown an interlocking switch 129 that is operated by an overload relay switch 130 and that serves to close the circuit of retaining magnet winding 131 only after the relay switch has been opened.

The system of Fig. 12 differs further from that of Fig. 2 in that it comprises a smaller number of switches 133, 134, 135, 136, 137 and 138 for governing the motor circuits after change-over and reversing switches 139 and 140, respectively, have been operated, and also in the arrangement of the circuits of magnet windings 141, 142, 143, 144, 145 and 146, respectively, of the switches 133 to 138 inclusive and in the means for governing these circuits. This, however, constitutes no part of my present invention, and since the switches 133 to 138 inclusive operate in a manner and sequence similar, except in position *a* where switches 134 and 135 are closed directly, to that which has been set forth for switches 12 to 17 inclusive of Fig. 2 and of switches 117 to 122 inclusive of Fig. 11, I deem it unnecessary to describe their operation in detail.

The structures and arrangements of interlocking switches 147 and 148 that are operated, respectively, by the change-over and reversing switches are also somewhat modified from those shown in Figs. 2 and 11, though their functions remain the same and their mode of operation is substantially the same. Magnet winding 149 of the change-over switch is adapted to be supplied from a circuit in shunt to a portion of auxiliary resistance 150 when direct current is supplied to the system, and magnet winding 151 of the change-over switch is adapted to be supplied from secondary winding 152 of an auxiliary transformer 153 when alternating current is supplied to the system. Magnet windings 154 and 155 of the reversing switch and magnet windings 141 to 146 inclusive, respectively, of the switches 133 to 138 inclusive and the retaining magnet winding 131 of the overload relay switch 130 are adapted to be connected between points 156 and 157 in the auxiliary resistance 150 when direct current is supplied to the system and in shunt to the secondary winding 152 of the auxiliary transformer 153 when alternating current is supplied to the system.

It should be pointed out that when the systems herein shown and described are applied to supply cars in a train that are adapted to be connected by train conductors whereby the several systems may be governed in multiple from the head of a train or any other suitable location therein, that the positions of the change-over switches will correspond to the character of energy that is supplied to that particular car since the magnet windings for causing operation of the switches are not interconnected by means of the train conductors. It is, therefore, impossible for direct current to be supplied to the motors when their circuits are arranged for operation by alternating current and vice versa.

It will, of course, be understood that the devices herein shown and described are only illustrative of suitable means that may be employed for the specific purposes. For instance, the magnet windings that cause operation of the various switches may serve only to control other means that are supplied with fluid pressure for operating the switches, so that only very small amounts of current need be supplied thereto to effect energization. The various circuits of the systems and the structural details of the devices for arranging the circuits may, obviously, be modified considerably within limits without departing from the spirit of the invention.

In two other applications, Serial Numbers 292,234 and 292,235, respectively, filed by me of even date herewith I have shown and described systems of control which differ from that herein disclosed in certain particulars that will be evident from a consideration thereof.

I claim as my invention:

1. The combination with a source of alternating current, a source of direct current, translating devices, a switch for arranging the circuits of the translating devices, and controlling magnet windings therefor, of a non-inductive resistance between points in which a controlling magnet winding for the circuit-arranging switch is connected, and a transformer, the primary winding of which is connected in series with the non-inductive resistance and the secondary winding of which may supply energy to the other controlling magnet winding of the circuit-arranging switch.

2. The combination with a source of alternating current, a source of direct current, translating devices, a change-over switch for arranging the circuits of the translating devices and controlling magnet windings therefor, of a non-inductive resistance between points in which a controlling magnet winding for the change-over switch is connected, an inductive winding, and a transformer, the primary winding of which is connected in series with the non-inductive resistance and the inductive winding, and the secondary winding of which may supply energy to the other controlling magnet winding of the change-over switch.

3. The combination with a source of alternating current, a source of direct current, translating devices, a reversing switch, a change-over switch for arranging the circuits of the translating devices and controlling magnet windings for said switches, of a non-inductive resistance, and a transformer, the primary winding of which is connected in series with the non-inductive resistance, one of the change-over switch controlling magnet windings and the controlling magnet windings of the reversing switch being supplied with energy from the secondary winding of the transformer when alternating current is supplied to the translating devices, and the other change-over switch controlling magnet winding and the reversing switch controlling magnet windings being supplied with energy from circuits in shunt to portions of the non-inducting resistance when direct current is supplied to the translating devices.

4. The combination with a source of direct current, a source of alternating current, translating devices, and means for arranging the circuits thereof, of a resistance, an inductive winding, a transformer the primary winding of which is connected in series with the resistance and the inductive winding, and means for controlling the circuit-arranging means which are supplied with energy from circuits in shunt to portions of the resistance when direct current is supplied to the translating devices and from the secondary circuit of the transformer when alternating current is supplied thereto.

5. The combination with a source of direct current, a source of alternating current, translating devices, and means for arranging the circuits thereof, of a resistance, an inductive winding, a transformer the primary winding of which is connected in series with the resistance and the inductive winding, means for arranging the circuits of the devices in accordance with the character of the energy that may be supplied thereto, switches for further adjusting the circuits of the devices, controlling magnet windings therefor, a switch located in circuit therewith that is opened when the current supplied to the devices exceeds a predetermined amount, and a magnet winding that retains the switch in open position and that may be supplied with energy from the inductive winding or the non-inductive resistance.

6. The combination with a source of direct current, a source of alternating current, translating devices, and means for arranging the circuits thereof, of a resistance, a transformer the primary winding of which is connected in series with the resistance, means for arranging the circuits of the devices in accordance with the character of the energy that may be supplied thereto, switches for further adjusting the circuits of the devices, controlling magnet windings therefor, a switch located in circuit therewith that is opened when the current supplied to the devices exceeds a predetermined amount and a magnet winding that retains the switch in open position and that may be supplied with energy from the secondary winding of the transformer or the non-inductive resistance.

7. The combination with a source of direct current, a source of alternating current, translating devices, and means for arranging the circuits thereof, of a resistance, an inductive winding, a transformer the primary winding of which is connected in series with the resistance and the inductive winding, the resistance being located between the inductive and the transformer windings, and means for controlling the circuit-arranging means which is supplied with energy from circuits in shunt to portions of the resistance when direct current is supplied to the translating devices and from the secondary circuit of the transformer when alternating current is supplied thereto.

8. The combination with a source of direct current, a source of alternating current, translating devices, a reversing switch and a switch for arranging the circuits of the translating devices, of controlling magnet windings for the switches, a resistance and a transformer the primary winding of which is connected in series with the resistance, the switch-controlling magnet windings being supplied with operative amounts of current from circuits in shunt to the resistance when direct current is available, and with operative amounts of alternating current from the transformer when alternating current is available.

9. The combination with a source of alternating current, a source of direct current and devices that may be operated from either source, of a reversing switch, a change-over switch for adjusting the circuits of the devices respectively for operation by alternating current and by direct current and means for preventing operation of the reversing switch until after operation of the change-over switch.

10. The combination with a source of alternating current, a source of direct current and devices that may be operated from either source, of a reversing switch, a change-over switch for adjusting circuits of the devices respectively for operation by alternating current and by direct current, means for causing automatic operation of the change-over switch in accordance with the character of energy that may be supplied to the devices and means for preventing operation of the reversing switch until after operation of the change-over switch.

11. The combination with a source of alternating current, a source of direct current and devices that may be operated from either source, of a reversing switch, a change-over switch for adjusting circuits of the devices respectively for operation by alternating current and by direct current, means for causing automatic operation of the change-over switch in accordance with the character of energy that may be supplied to the devices, means for further adjusting the circuits of the devices and means for preventing the operation thereof and of the reversing switch until after operation of the change-over switch.

12. The combination with a source of alternating current, a source of direct current and devices that may be operated from either source, of a reversing switch, a change-over switch for adjusting circuits of the device respectively for operation by alternating current and by direct current, switches for further controlling the circuits of the devices and magnet windings for all of said switches, and means for preventing energizing of the magnet windings of the reversing switch and of the circuit controlling switches until the change-over switch has been operated.

13. The combination with a source of alternating current, a source of direct current and devices that may be operated from either source, of a reversing switch, a change-over switch for adjusting the circuits of the devices for operation by alternating current and by direct current respectively, switches for further controlling the circuits of the devices and magnet windings for all of said switches, means whereby the change-over switch magnet windings may be energized to cause operation thereof in accordance with the character of energy that may be supplied to the devices, and means for preventing energizing of the magnet windings of the reversing switch and of the circuit controlling switches until the change-over switch has been operated.

14. The combination with a source of alternating current, a source of direct current, devices that may be supplied from either of the sources, a reversing switch, a change-over switch for adjusting the circuits of the devices for operation respectively by alternating current and by direct current and means for further adjusting the circuits of the devices, of means for preventing the further adjustment of the circuits when the current supplied to the devices exceeds a predetermined amount.

15. The combination with a source of alternating current, a source of direct current, devices that may be supplied from either of the sources, a reversing switch, a change-over switch for adjusting the circuits of the devices for operation respectively by alternating current and by direct current and means for further adjusting the circuits of the devices, of means for preventing the further adjustment of the circuits when the current supplied to the devices exceeds a predetermined amount and until after the reversing switch has been returned to its "off" position.

16. The combination with a source of alternating current, a source of direct current, devices that may be supplied from either of the sources, a reversing switch, a change-over switch for adjusting the circuits of the devices for operation respectively by alternating current and by direct current, means for further adjusting the circuits of the devices, and a master switch, of means for preventing a further adjustment of the circuits when the current supplied to the devices exceeds a predetermined amount and until after the master switch has been returned to its "off" position.

17. The combination with a source of alternating current, a source of direct current, devices that may be operated from either source, a reversing switch, a change-over switch for adjusting the circuits of the devices for operation respectively by alternating current and by direct current, a set of switches for further adjusting the circuits of the devices, and controlling magnet windings for all of said switches, of a switch that is located in the circuit of the controlling magnet windings for the switches of the set and that prevents energizing thereof when the current supplied to the devices exceeds a predetermined amount.

18. The combination with a source of alternating current, a source of direct current, devices that may be operated from either source, a reversing switch, a change-over switch for adjusting the circuits of the devices for operation respectively by alternating current and by direct current, a set of switches for further adjusting the circuits of the devices and controlling magnet windings for all of said switches, of a switch that interrupts the circuit of the magnet windings of the switches of said set when the current supplied to the devices exceeds a predetermined amount and that maintains such a condition until the reversing switch has been returned to its "off" position.

19. The combination with a source of alternating current, a source of direct current, devices that may be operated from either source, a reversing switch, a change-over switch for adjusting the circuits of the devices for operation respectively by alternating current and by direct current, a set of switches for further adjusting the circuits of the devices and controlling magnet windings for all of said switches, of a switch that opens and thereby interrupts the circuit of the magnet windings of the switches of said set when the current supplied to the devices exceeds a predetermined amount and a magnet winding for the switch that becomes energized only after opening of the switch.

20. The combination with a source of alternating current, a source of direct current and devices that may be operated from either source, of a reversing switch, a change-over switch for adjusting circuits of the devices respectively for operation by alternating current and by direct current, switches for further controlling the circuits of the devices and magnet windings for all of said switches, means whereby the change-over switch magnet windings may be energized respectively to cause operation thereof in accordance with the character of energy that may be supplied to the devices, means for preventing energizing of the reversing switch magnet windings until the change-over switch has been operated, and means for preventing operation of the circuit-controlling switches until the reversing switch has been operated.

21. The combination with a source of alternating current, a source of direct current and devices that may be operated from either source, of a reversing switch, a change-over switch for adjusting the circuits of the devices for operation by alternating current and by direct current, respectively, means for causing automatic operation of the change-over switch in accordance with the character of energy that may be supplied to the devices, a set of switches for further adjusting the circuits of the devices, means for preventing operation of the reversing switch until after operation of the change-over switch, and means for preventing operation of the switches of the set until after operation of the reversing switch.

22. The combination with a source of alternating current, a source of direct current and translating devices, of a switch for adjusting the circuit relations of the devices with respect to each other to adapt them for operation by either alternating current or by direct current and means for automatically moving the switch in accordance with the character of energy that may be supplied to the devices.

23. The combination with a source of alternating current, a source of direct current, translating devices and a switch for arranging the circuits of the devices for operation thereof by either character of energy, of means for automatically moving the switch in accordance with the character of energy that may be utilized and means for preventing a supply of energy to the translating devices until the circuit-arranging switch has been moved to a position corresponding to the character of energy supplied.

24. The combination with a source of alternating current, a source of direct current, translating devices, a reversing switch and a switch for arranging the circuits of the translating devices in accordance with the character of energy that may be utilized, of means for preventing operation of the reversing switch unless the circuit-arranging switch has been moved to a position corresponding to the character of energy supplied.

25. The combination with a source of alternating current, a source of direct current and translating devices, of a switch for adjusting the circuit relations of the devices for operation thereof by either alternating current or direct current, a transformer, a resistance and means supplied from the resistance or from the transformer for effecting automatic operation thereof according to the character of the energy that may be supplied to the devices.

26. The combination with a source of alternating current, a source of direct current and translating devices that may be operated by either character of energy, of a transformer, a resistance, means for adjusting the circuits of the devices that are supplied either from the transformer or from the resistance according to the character of the energy that is supplied to the devices.

27. In combination, a motor adapted for operation on either alternating current or on direct current, a variable resistance, a variable transformer element, a controller, and a switch device arranged to alternately connect said resistance and said transformer element in operative relation to said controller and said motor, whereby said controller operates to vary the amount of resistance in the motor-circuit when operating on direct current and to vary the terminal voltage of the motor when operating on alternating current.

28. In combination, a motor adapted for operation on either alternating current or on direct current, a resistance, a transformer element, a controller having a plurality of sets of contacts, and a switch device arranged to connect the motor to one terminal of the resistance and the controller-contacts to a plurality of points on said resistance and to disconnect the resistance and connect the controller, transformer element and motor in operative relation with the controller-contacts connected to said transformer element at a plurality of points, whereby the controller serves to regulate the amount of resistance in the motor-circuit on direct current and the terminal voltage of the motor on alternating current.

29. In combination, a motor adapted to operate on either alternating or direct current, a device for governing the speed of the motor when operating on direct current, a device for governing the speed of the motor when operating on alternating current, a controller constructed and arranged to control each of said devices, and a switch arranged to connect the controller and motor in operative relation with either speed-governing device, whereby the same controller regulates the speed of the motor when operating on either alternating or direct current through the intervention of a governing device adapted to the particular current in use.

30. In combination, a motor adapted to operate on either alternating or direct current, a resistance device for governing the speed of the motor when operating on direct current, a variable potential device for governing the speed of the motor when operating on alternating current, a controller constructed and arranged to control each of said devices, and a switch arranged to connect the controller and motor in operative relation with either speed-governing device, whereby the same controller regulates the speed of the motor when operating on either alternating or direct current through the intervention of a governing device adapted to the particular current in use.

31. In combination, a motor adapted for operation on either alternating or direct current, a resistance, a transformer element, a controller having a plurality of sets of contacts arranged to engage in successive running positions of the controller, a switch device arranged to connect the controller in operative relation with the motor and resistance and to disconnect the resistance and connect the controller, transformer element and motor in operative relation to each other with one contact of each of said sets connected to a point on said transformer, an auxiliary resistance, and means for connecting said auxiliary resistance across successively active sets of contacts in position of the controller intermediate the running position.

In testimony whereof, I have hereunto subscribed my name this 15th day of December, 1905.

RAY P. JACKSON.

Witnesses:
   OTTO S. SCHAIRER,
   BIRNEY HINES.